US009825981B2

(12) United States Patent
Roytman et al.

(10) Patent No.: US 9,825,981 B2
(45) Date of Patent: *Nov. 21, 2017

(54) ORDERED COMPUTER VULNERABILITY REMEDIATION REPORTING

(71) Applicant: Risk I/O, Inc., Chicago, IL (US)

(72) Inventors: Michael Roytman, Chicago, IL (US); Edward T. Bellis, Evanston, IL (US); Jeffrey Heuer, Chicago, IL (US)

(73) Assignee: Kenna Security, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/941,927

(22) Filed: Nov. 16, 2015

(65) Prior Publication Data
US 2016/0072835 A1    Mar. 10, 2016

Related U.S. Application Data

(63) Continuation of application No. 14/642,620, filed on Mar. 9, 2015, now Pat. No. 9,270,695, which is a
(Continued)

(51) Int. Cl.
G06F 21/00 (2013.01)
H04L 29/06 (2006.01)
(Continued)

(52) U.S. Cl.
CPC ........ H04L 63/1433 (2013.01); G06F 21/577 (2013.01); H04L 63/1408 (2013.01); G06Q 10/06311 (2013.01)

(58) Field of Classification Search
None
See application file for complete search history.

(56) References Cited

U.S. PATENT DOCUMENTS 7,278,163 B2    10/2007 Banzhof et al.
7,380,270 B2    5/2008 Tracy et al.
(Continued)

OTHER PUBLICATIONS

U.S. Appl. No. 14/642,620, filed Mar. 9, 2015, Office Action, dated Apr. 30, 2015.
(Continued)

Primary Examiner — Brandon Hoffman
(74) Attorney, Agent, or Firm — Hickman Palermo Becker Bingham LLP

(57) ABSTRACT

Techniques for ranking a set of vulnerabilities of a computing asset and set of remediations for a computing asset, and determining a risk score for one or more computing assets are provided. In one technique, vulnerabilities of computing assets in a customer network are received at a vulnerability intelligence platform. Breach data indicating set of breaches that occurred outside customer network is also received. A subset of the set of vulnerabilities that are most vulnerable to a breach is identified based on the breach data. In another technique, multiple vulnerabilities of a computing asset are determined. A risk score is generated for the computing asset based on the vulnerabilities. In another technique, multiple remediations associated with a risk score and multiple vulnerabilities are identified. The remediations are ordered based on the remediations that would reduce the risk score the most if those remediations were applied to remove the corresponding vulnerabilities.

24 Claims, 9 Drawing Sheets

Related U.S. Application Data continuation of application No. 14/181,415, filed on Feb. 14, 2014, now Pat. No. 8,984,643.

(51) Int. Cl.
  *G06F 21/57* (2013.01)
  *G06Q 10/06* (2012.01)

(56) References Cited

U.S. PATENT DOCUMENTS

| | | | |
|---|---|---|---|
| 7,552,480 B1 | 6/2009 | Voss | |
| 7,908,657 B1 | 3/2011 | Hernacki | |
| 8,020,210 B2 | 9/2011 | Tippett et al. | |
| 8,201,257 B1 | 6/2012 | Andres et al. | |
| 8,495,757 B2 | 7/2013 | Nakawatase et al. | |
| 8,595,845 B2 | 11/2013 | Basavapatna et al. | |
| 2002/0147803 A1 | 10/2002 | Dodd et al. | |
| 2003/0126472 A1* | 7/2003 | Banzhof | G06F 21/577 726/25 |
| 2005/0108037 A1 | 5/2005 | Bhimani et al. | |
| 2005/0229255 A1 | 10/2005 | Gula et al. | |
| 2007/0067846 A1 | 3/2007 | McFarlane et al. | |
| 2008/0209566 A1 | 8/2008 | Ziv | |
| 2010/0125912 A1 | 5/2010 | Greenshpon et al. | |
| 2011/0185431 A1 | 7/2011 | Deraison | |
| 2011/0214183 A1 | 9/2011 | Fudge | |
| 2011/0231935 A1* | 9/2011 | Gula | H04L 43/028 726/25 |
| 2012/0144494 A1 | 6/2012 | Cole et al. | |
| 2012/0185945 A1 | 7/2012 | Andres et al. | |
| 2012/0203590 A1 | 8/2012 | Deb et al. | |
| 2012/0304300 A1 | 11/2012 | LaBumbard | |
| 2013/0074188 A1 | 3/2013 | Giakouminakis et al. | |
| 2013/0191919 A1* | 7/2013 | Basavapatna | G06F 21/577 726/25 |
| 2013/0239168 A1 | 9/2013 | Sreenivas et al. | |
| 2014/0007241 A1 | 1/2014 | Gula et al. | |
| 2014/0172495 A1 | 6/2014 | Schneck et al. | |
| 2014/0173739 A1 | 6/2014 | Ahuja et al. | |
| 2015/0237062 A1 | 8/2015 | Roytman et al. | |
| 2015/0237065 A1 | 8/2015 | Roytman | |

OTHER PUBLICATIONS

U.S. Appl. No. 14/642,620, filed Mar. 9, 2015, Notice of Allowance, dated Oct. 14, 2015.

U.S. Appl. No. 14/181,415, filed Feb. 14, 2014, Notice of Allowance, dated Oct. 27, 2014.

U.S. Appl. No. 14/181,415, filed Feb. 14, 2014, Office Action, dated May 13, 2014.

U.S. Appl. No. 14/181,352, filed Feb. 14, 2014, Final Office Action, dated Aug. 18, 2014.

U.S. Appl. No. 14/181,352, filed Feb. 14, 2014, Final Office Action, dated Jun. 29, 2015.

U.S. Appl. No. 14/181,352, filed Feb. 14, 2014, Office Action May 2, 2014.

U.S. Appl. No. 14/181,352, filed Feb. 14, 2014, Office Action, dated Jan. 16, 2015.

Tenable Network Security, Nessus TM The World's Most Trusted Vulnerability Scanner, dated Jan. 14, 2014, 2 pages.

Tenable Network Security, Nessus 5.0 Flash User Guide, dated Apr. 22, 2013,69 pages.

Sebastian Nicilaescu et al., Journal of applied quantitive methods, security metrics for enterprise information systems, issue 2, dated Dec. 2006.

Ron Gula Jul. 2007 NPL-CVSS, http://www.tenable.com/blog/cvss-version-2-scoringwith-nessus-and-the-passive-vulnerability-scanner, obtained date Jun. 26, 2014, 5 pages.

Hsia et al., Using the vulnerability information of computer systems to improve the network security, vol. 30, Issue 9, dated Jun. 30, 2007, pp. 2032-2047.

Bellis, Ed, Automating Vulnerability Management at Orbitz with SCAP, Dated Oct. 27, 2009, Obritz Worldwide, 21 pages.

* cited by examiner

ORDERED COMPUTER VULNERABILITY REMEDIATION REPORTING

PRIORITY AND CROSS-REFERENCE TO RELATED APPLICATIONS

This application claims benefit under 35 U.S.C. §120 as a Continuation of application Ser. No. 14/642,620 filed Mar. 9, 2015, which was co-pending at the time of filing of this application but has since issued as U.S. Pat. No. 9,270,695 on Feb. 23, 2016; which is a continuation of Ser. No. 14/181,415, filed on Feb. 14, 2014, now U.S. Pat. No. 8,984,643 issued Mar. 17, 2015, which is related to U.S. patent application Ser. No. 14/181,352 filed Feb. 14, 2014; and U.S. patent application Ser. No. 14/181,382 filed Feb. 14, 2014, now U.S. Pat. No. 8,966,639 issued February 24, the entire contents of each of which are hereby incorporated by reference for all purposes as if fully set forth herein.

TECHNICAL FIELD

The present disclosure generally relates to providing information technology (IT) security risk information. The disclosure relates more specifically to techniques for correlating IT security risks from various security risk sources.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The number of attacks on various IT assets of an enterprise has increased tremendously. The rise in attacks has led to creation and adoption of numerous tools to perform IT security vulnerability assessments. Each security vulnerability assessment tool tends to differ from other security vulnerability assessment tools in that each tool provides one or two features that other security vulnerability assessment tools do not provide. Therefore, it is quite common for an enterprise to use a plurality of security vulnerability assessment tools in assessing security vulnerabilities of their IT assets. In addition, many enterprises also hire third party auditors to audit the enterprise's IT assets. In fact, certain industries, such as the financial services healthcare industries, are required to have their IT assets periodically audited by third party IT auditors.

The result of using numerous tools and auditing firms to assess vulnerabilities of IT assets is the generation of large amount of data. Once the tools and the auditing firms produce the vulnerability data, the enterprise's IT security team must use the data to reduce each IT asset's risk of being successfully attacked. Unfortunately, the data generated by the tools and the auditors fail to provide the enterprise's IT security team with the necessary information to efficiently and effectively prioritize their task of reducing security risk to the enterprise's IT assets.

Therefore, more often than not, the enterprise's IT security team spends additional resources and incurs further costs in analyzing the data generated by the security vulnerability assessment tools and IT auditors in order to distinguish between the more critical IT security risks and the less critical ones. Furthermore, due to the inherent inaccuracy and inherent lack of information regarding the likelihood of a successful attack on an IT asset in the generated data, the enterprise's IT security team's further efforts fail to satisfactorily defend against the most likely and potentially successful attacks on the enterprise's IT assets. This problem is further exacerbated as the number of IT assets utilized by an enterprise grows at a rapid pace because the amount of vulnerability data generated by numerous security vulnerability tools and IT auditors would consequently grow at a significantly faster pace.

DESCRIPTION OF EXAMPLE EMBODIMENTS

Figure 1:
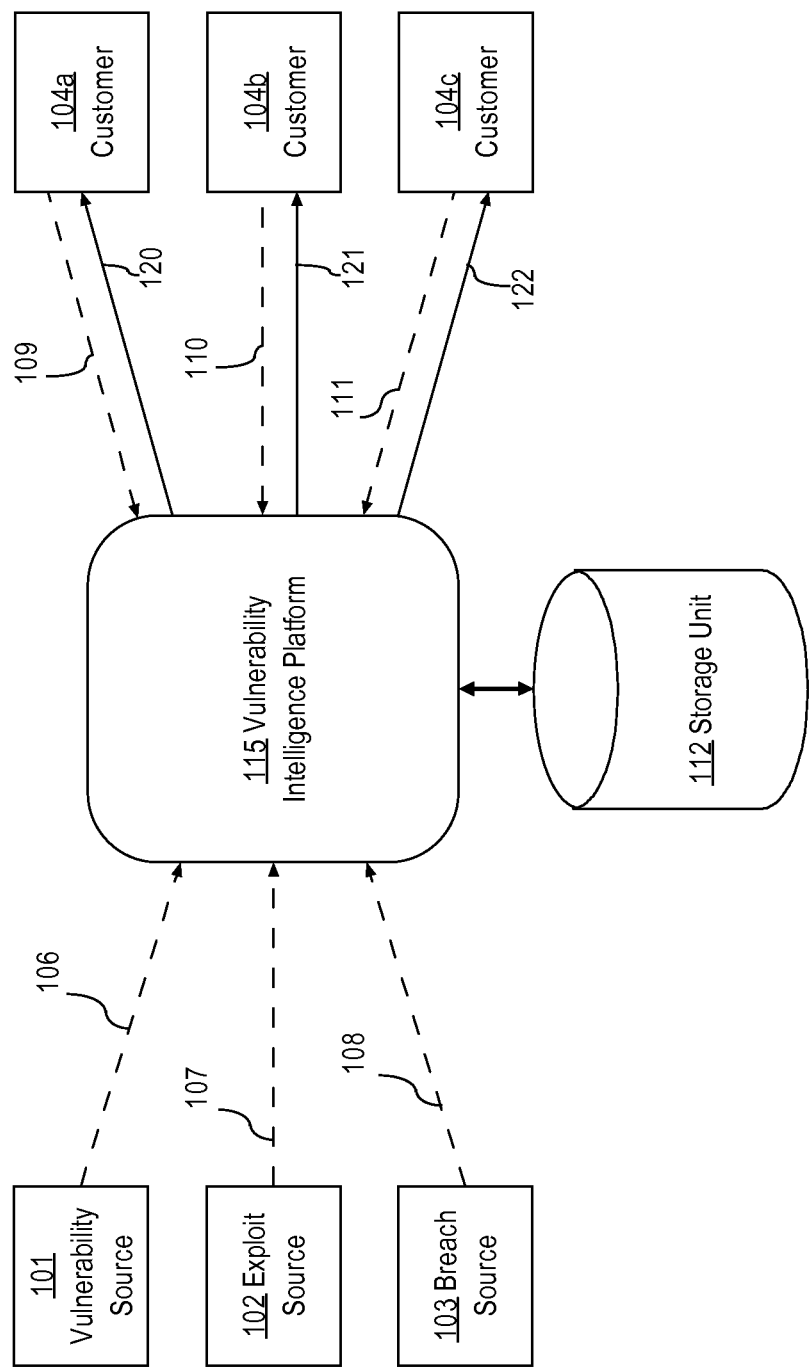
FIG. 1 illustrates an example arrangement of providing customer with IT security risk information.

In the following description, for the purposes of explanation, numerous specific details are set forth in order to provide a thorough understanding of the present disclosure. It will be apparent, however, to one skilled in the art that the present disclosure may be practiced without these specific details. In other instances, well-known structures and devices are shown in block diagram form in order to avoid unnecessarily obscuring the present disclosure.

Embodiments are described herein according to the following outline:
 1.0 Overview
 2.0 Structural and Functional Overview
 3.0 Correlating Vulnerability Data With Breach Data
 4.0 Risk Meter
 5.0 Remediation List
 6.0 Implementation Mechanisms—Hardware Overview
 7.0 Extensions and Alternatives

1.0 OVERVIEW

In an embodiment, a method is described for identifying vulnerabilities that are most vulnerable to a breach. In an embodiment, vulnerability data that indicates a set of vulnerabilities of computing assets in a customer network are received at, for example, an application server. Breach data that indicates a set of breaches that occurred outside the customer network are received at the application server. A subset of the set of vulnerabilities that are most vulnerable to the breach are identified, based on the breach data. Result data that identifies the subset of the set of vulnerabilities that are most vulnerable to a breach is displayed on the device.

In an embodiment, a plurality of vulnerabilities of a computing asset are determined. A risk score for the computing asset is generated based on the plurality of vulnerabilities. A graphic that represents the risk score may be displayed and, in response to user selection, cause information about a subset of the vulnerabilities to be displayed.

In an embodiment, a set of remediations associated with a risk score and a set of vulnerabilities are identified. A remediation may be any solution to resolve a vulnerability of a computing asset. An amount by which the risk score would be reduced is determined for each remediation in the set of remediations, if the remediation is applied to a corresponding vulnerability in the set of vulnerabilities. The set of remediations are ordered based on the amount determined for each remediation in the set of remediations.

Embodiments encompass a data processing system, a computer apparatus, or a computer-readable medium configured to carry out the foregoing steps.

2.0 STRUCTURAL AND FUNCTIONAL OVERVIEW

Certain embodiments are configured to help reduce or eliminate costs associated with vulnerability data that fail to provide information regarding the likelihood of a successful attack on a computing asset. As described herein, a computing asset may be any technology that enables or performs computations, such as, a programming language, source code, a software application, a database, an operating system, a desktop computer, a server, or a hardware computing or communication device.

In an embodiment, by utilizing breach data, sourced from across the internet, and correlating that data with vulnerabilities discovered in computing assets in a customer network, vulnerability data of an enterprise's IT security team may be generated that includes information regarding the likelihood that an exploit of a particular vulnerability of a particular asset will be successful.

For purposes of illustrating a clear example, assume that a business organization owns numerous computing assets and uses several security vulnerability assessment tools to detect vulnerabilities in the computing assets. Additionally, the computing assets are periodically audited by IT auditors. The data gathered and presented by the assessment tools and the IT auditors may inform the business organization of the vulnerabilities of their computing assets; however, the business organization has no information upon which it can rely on to effectively and efficiently determine which of the vulnerabilities pose the most significant threat to the organization and address the vulnerabilities accordingly. Therefore, the business organization must still expend additional time and financial and human resources in determining the vulnerabilities that are most likely to allow for a breach of a computing asset to occur. In order to accurately prioritize their approach to reducing risks to the assets the business organization must still be able to determine information about the risks to an asset rather than just information about vulnerabilities, and in order to effective and efficiently resolve vulnerabilities of computing assets, it would be a tremendous asset to have an ordered list of remediations where the first remediation will successfully reduce the risk of a computing asset the most.

In an embodiment, a vulnerability threat management platform requests data about breaches, exploits, vulnerabilities of computing assets from various data sources such as Alien Vault's Open Threat Exchange, RiskDB, the National Vulnerability Database, the Web Applications Security Consortium (WASC), the Exploit Database, SHODAN, and the Metasploit Project. As referred to herein, a breach is a successful exploit. That is, a breach is a successful attack on a computing asset by successfully exploiting a vulnerability of the computing asset.

The vulnerability threat management platform may also request or be provided with data from one or more customers, comprising of information of vulnerabilities associated with each customer's computing assets. The vulnerability threat management platform may then, for each customer, correlate each vulnerability of the customer's computing asset to all breaches of the vulnerability. For each customer, the vulnerability threat management platform may then provide a ranked or ordered list of vulnerabilities which represent the order in which the vulnerabilities should be addressed, such that the vulnerability that poses the most significant threat is addressed first and the one that poses the least significant threat is addressed last.

In some embodiments, the vulnerability threat management platform may provide a quantified measure, known as a risk score herein, to indicate how vulnerable a particular asset may be of being successfully exploited or breached. The risk score may be a numerical value in a range of numerical values. For example, the risk score may represent a value between 0 and 1000, where the higher the number, the more at risk that particular computing asset or group of assets is of being successfully exploited or breached.

A risk score for a vulnerability or a computing asset may not only be based on a likelihood of a breach occurring with respect to that vulnerability or asset, but also based on how important the impact of a vulnerability exploit or asset is. For example, a computing asset may have two vulnerabilities, each of which have the same likelihood of being breached. However, one of the two vulnerabilities, if breached, results in sensitive financial information being accessible to unscrupulous users while the other vulnerability, if breached, results in the ability by unscrupulous users to merely post an innocuous message.

The vulnerability threat management platform may provide a risk score for each computing asset and/or a group of computing assets.

In some embodiments, the risk score may be determined by considering all vulnerabilities a particular asset may have. Thus, rather than simply having information about a list of vulnerabilities, the customer has an ordered list of at-risk computing assets such that the customer may now easily know which computing asset or vulnerability the customer should attempt to address first.

In some embodiments, the Vulnerability threat management platform also provides an ordered list of remediations, which can be used to resolve one or more vulnerabilities of one or more computing assets. For example, a particular computing asset may have a number of vulnerabilities, and a particular remediation may address one or more of the vulnerabilities of computing asset. The application of the remediation will reduce the computing asset's risk score, where application or utilization of the first remediation on the list will most significantly reduce the risk score of the asset, and application or utilization of the last remediation on the list will least significantly reduce the risk score of the asset. Thus, the customer may now completely eliminate the additional costs associated with searching for a solution for a particular vulnerability and/or determining which of the available solutions will most significantly reduce the computing asset's risk score.

The foregoing approaches, structures and functions are described further herein in connection with FIG. 1 and the other drawings. A data storage unit, in this context, may be any electronic digital data recording device configured to store data according to a set of rules and in any format, such as a flat file, a database, a data mart, a data warehouse or other storage units. A data source, in this context, may be any electronic digital data storage unit capable of providing data to a requesting entity at a frequency of a particular time interval or on-demand.

FIG. 1 illustrates an example arrangement of assessing one or more computing assets' risk of being breached using external threat data and vulnerabilities of the one or more computing assets. As described herein, threat data may refer to any information related to security or risks posed by one or more vulnerabilities of a computing asset.

FIG. 1 depicts a networked computer system that includes a vulnerability threat management platform 115, a plurality of data sources 101, 102, 103, a data storage unit 112, and a plurality of customers 104a, 104b, 104c.

In this example, data sources 101, 102, 103 publish or provide particular threat-related data. Sources 101-103 may publish the thread-related data at a particular time interval. For instance, data source 101 may publish or provide vulnerability related data 106 every hour, data source 102 may publish or provide exploit related data 107 every half hour, and data source 103 may also publish or provide breach related data 108 every 45 minutes. Thus, the frequency at which data sources 101, 102, 103 publish or provide information may be independent of each other.

In some embodiments, vulnerability threat management platform 115 requests data 106, 107, 108 at the particular time intervals that they become available. In some embodiments, data sources 101, 102, 103 may directly send data 106, 107, 108, respectively, to vulnerability threat management platform 115 at the time such data becomes available.

Customers 104a, 104b, 104c provide, to vulnerability threat management platform 115, vulnerability data that indicates vulnerabilities of their computing assets, 109, 110, 111, respectively. Additionally, customers 104a, 104b, 104c, may provide contextual information related to a particular computing asset, such as a relative importance of the particular computing asset. For example, one particular computing asset of a customer may be absolutely critical for the customer to carry out its day-to-day operations. Therefore, the customer may indicate that the particular computing asset is the most important of its computing assets. As another example, all computing assets that a customer "tags" as important may be considered equally important while all other non-tagged computing assets may be treated as equally less important (at least relative to the tagged assets).

In an embodiment, vulnerability threat management platform 115 is hosted by a customer and, thus, interaction with other customers 104a-104c is not necessary. In other words, vulnerability data 109-111 may not be relevant since the customer may implement Vulnerability threat management platform 115 only for its own benefit.

In an embodiment, vulnerability threat management platform 115 is hosted on an application server computer capable of executing procedures, such as programs, routines, scripts or other computer executable commands, necessary for supporting the vulnerability intelligence platform. An example of a Vulnerability threat management platform is Vulnerability Threat Monitoring and Prioritization Platform, commercially available from Risk I/O, Incorporated, Chicago, Ill. In FIG. 1 Vulnerability threat management platform 115 is coupled with data storage unit 112. In some embodiments, data storage unit 112 may store contextual information related to customers using Vulnerability threat management platform 115.

Figure 2:
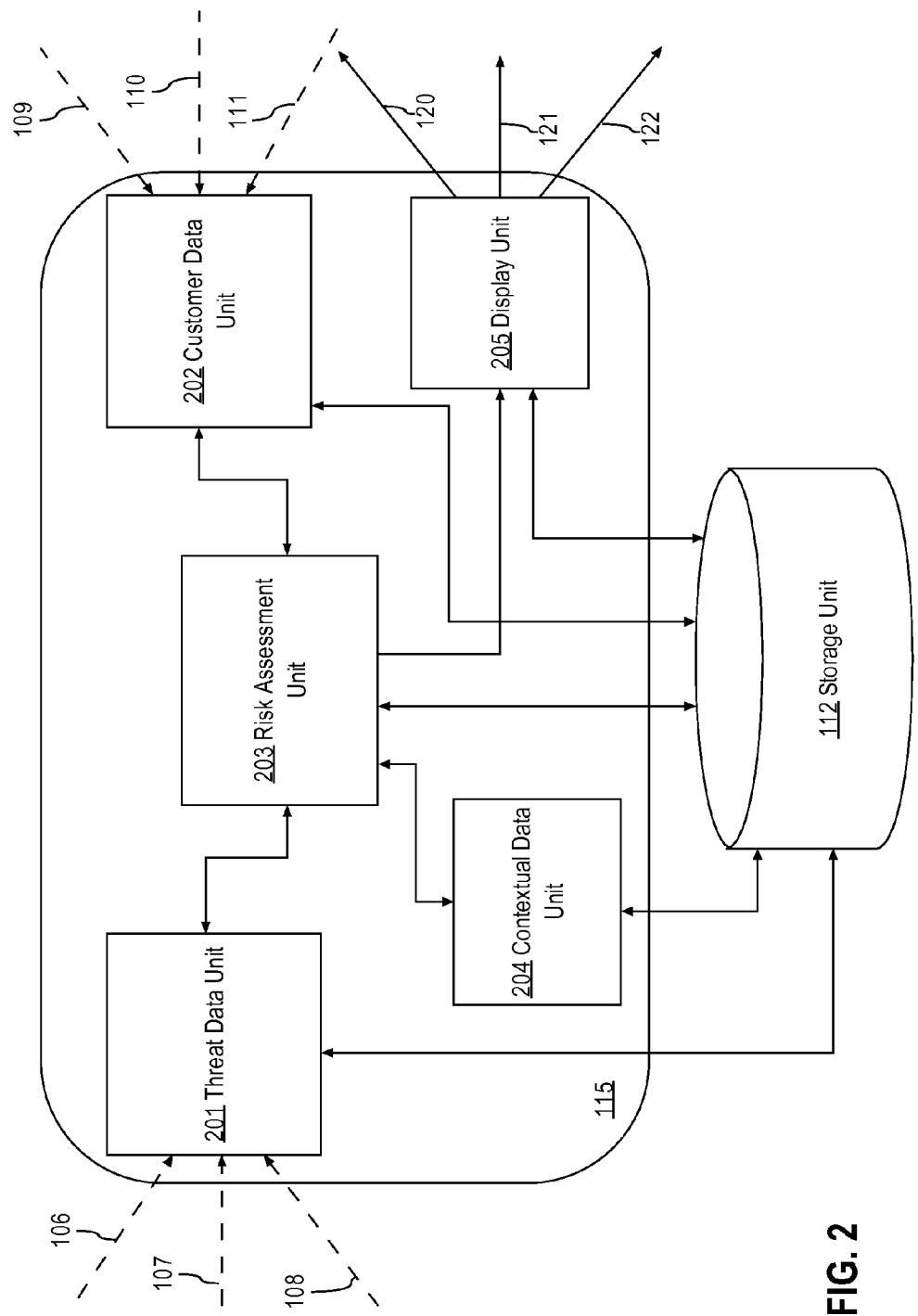
FIG. 2 illustrates functional logic of an embodiment as implemented in an application server coupled to a data storage unit.

FIG. 2 illustrates functional logic of an embodiment of a vulnerability threat management platform implemented on an application server computer coupled with a data storage unit. In an embodiment, the application server computer comprises of at least one instance of vulnerability threat management platform 115. Vulnerability threat management platform 115 may include or may be coupled to an HTTP server and may be configured to serve HTML documents that browser programs at the customers 104a-104c can receive, render, and display.

In an embodiment, vulnerability threat management platform 115 includes a threat data unit 201. In an embodiment, threat data unit 201 may be coupled to the data storage unit 112. Threat data unit 201 receives vulnerability data 106, exploit data 107, and breach data 108 and stores them in storage unit 112. In an embodiment, vulnerability, exploit, and breach data received at threat data unit 201 may be stored in storage unit 112 according to vulnerability identifier, such as a CVE-ID or a WASC ID. In an embodiment, threat data unit 201 may be configured to fetch data from various vulnerability, exploit and breach data sources at a defined time interval. The time interval defined to fetch data may depend upon the frequency at which the data sources make the data available. For example, if a vulnerability, exploit, and breach data sources make data available at every hour, forty five minutes, and thirty minutes respectively, then vulnerability and breach data unit 201 may be configured to fetch data from vulnerability data source every hour, exploit data source every forty five minutes, and breach data source at every thirty minutes.

In an embodiment, vulnerability threat management platform 115 includes a customer data unit 202. Customer data unit 202 is configured to receive vulnerability data 109, 110, 111, from customers. In an embodiment, customer data unit 202 may be coupled to storage unit 112 and may be configured to store vulnerability data received from customers in storage unit 112. Customer data unit 202 may also be configured to receive data related to customer preferences and store that data in storage unit 112. For example, customers may send data related to importance of one computing asset relative to other computing assets, or information related to grouping of particular computing assets.

In an embodiment, vulnerability threat management platform 115 includes a risk assessment unit 203. Risk assessment unit 203 may be coupled to threat data unit 201, customer data unit 202, contextual data unit 204, display unit 205, and storage unit 112. Risk assessment unit 203 may be configured to determine rank or order of vulnerabilities of customer's computing assets or group of computing assets. Risk assessment unit 203 may also be configured to determine a risk score for a computing asset or group of computing assets, and may also be configured to determine a ranked or ordered list of remediations for a computing asset or a group of computing assets.

In an embodiment, risk assessment unit 203 ranks or orders a list of vulnerabilities of a computing asset based on successful active breaches of the particular vulnerability. Risk assessment unit 203 may determine the number successful active breaches of a particular vulnerability based on the breach data 108 stored in storage unit 112. In an embodiment, risk assessment unit 203 ranks or orders the list of vulnerabilities based on the number of exploits available for each vulnerability in addition to a number of active breaches of a particular vulnerability. In an embodiment, risk assessment unit 203 determines the number of exploits based on exploit data 107. Risk assessment unit 203 may also rank or order the list of vulnerabilities based on the CVSS score of a vulnerability in addition to the number of breaches of a particular vulnerability.

Risk assessment unit 203 may store the ranked or ordered list of vulnerabilities in storage unit 112.

Risk assessment unit 203 may also determine a risk score for a computing asset or a group of computing assets based on the contextual data, of the computing asset or group of computing assets, provided from contextual data unit 204.

In an embodiment, contextual data unit 204 selects contextual factors relevant to the computing asset and/or the customer that owns the computing asset from storage unit 112 and provides the contextual factors to risk assessment unit 203. In an embodiment, risk assessment unit 203 stores the risk score in storage unit 112. Using contextual factors from contextual data unit 204, risk assessment unit 203 adjusts the risk score of a computing asset or a group of computing assets such that the risk score reflects qualitative factors, such as importance of a computing asset (or group of computing assets) to the customer, or a computing asset's popularity across the Internet.

In an embodiment, risk assessment unit 203 ranks or orders a list of remediations to address the vulnerabilities of a computing asset or a group of computing assets. Risk assessment unit 203 determines the rank or order of the list of remediations for vulnerabilities based on the impact of each particular remediation on a risk score of a computing asset or a group of computing assets. Risk assessment unit 203 may store the ranked or ordered list of remediations in storage unit 112.

In an embodiment, risk assessment unit 203 determines the impact of a particular remediation on a risk score based on the number of vulnerabilities the particular remediation resolves. Risk assessment unit 203 may also rank or order a list of remediations based on ease of implementation or application of a particular remediation. Therefore, a customer that is presented with the list of remediations may be confident to rely on the list for the easiest remediations that have the largest impact on reducing the risk posed by vulnerabilities of a computing asset.

In an embodiment, after ranking or ordering vulnerabilities, a list of remediations, and/or determining one or more risk scores, risk assessment unit 203 provides such data to display unit 205. Display unit 205 may be configured to cause data 120-122 to be displayed to customers. In an embodiment, display unit 205 alters its presentation of data to customers from a default presentation, based on customer preferences for data presentation.

As noted previously, vulnerability threat management platform 115 may be implemented by a customer only for its benefit. Thus, there would be no other customers 104a-104c involved. Furthermore, result data 120-122 would not be generated for any other customers.

3.0 CORRELATING VULNERABILITY DATA WITH BREACH DATA

Vulnerability threat management platform 115 analyzes the vulnerability data of computing assets of customers 104a-104c, against threat data from various sources, such as data sources 101-103, and provides result data 120-122 to customers 104a-104c, respectively. Result data 120-122 includes information related to risks that the corresponding customer faces because of the vulnerabilities of the corresponding customer's computing assets. The result data may identify one or more of the most important vulnerabilities of a customer (based on breach data associated with the vulnerabilities). For example, the top five vulnerabilities with the highest number of breaches (or the vulnerabilities that are associated with at least a threshold number of breaches) in a most recent time interval are identified and information about those vulnerabilities are provided in the result data. Result data for a particular customer may be provided automatically to that customer or may be provided to the customer upon request.

In an embodiment, the information related to risks posed by the vulnerabilities may be presented as a ranked or ordered list of vulnerabilities, where the first vulnerability on the ranked or ordered list indicates the vulnerability that will most likely be exploited. In an embodiment, vulnerability threat management platform 115 ranks or orders the list of vulnerabilities based off the number of breaches of a particular vulnerability. For example, the number of breaches of vulnerability CVE-2014-0001 is 5 and number of breaches of vulnerability CVE-2014-0002 is 7. Vulnerability threat management platform 115 may determine that CVE-2014-0002 is more likely to be exploited and rank CVE-2014-0002 higher than CVE-2014-0001.

As described earlier, a breach is a successful exploit. Relying upon breach data to determine and predict the vulnerability that is most likely to be exploited, and thus pose the most serious risk to the computing asset, is more accurate and reliable than relying upon threat data comprising only of existing exploits of a vulnerability or a Common Vulnerability Scoring System (CVSS) score of a vulnerability. Additionally, reliance only upon existence of an exploit of a vulnerability and/or CVSS score of vulnerability, often provides incomplete and thus misleading information about the significance of the risk posed by the vulnerability to the computing asset. For example, it is possible to have a vulnerability with a high CVSS score, indicating that it is a critical vulnerability. However, no recent successful exploits, or breaches, of the vulnerability may have occurred. Therefore, while the vulnerability may be critical according to its CVSS score, it does not pose a significant threat to the computing asset since it is unlikely to be breached.

In an embodiment, vulnerability threat management platform 115 rank or orders the list of vulnerabilities based on a number of exploits available for each vulnerability in addition to a number of breaches of each vulnerability. In an embodiment, exploit data 107 includes a vulnerability identifier to indicate a particular vulnerability and a number of exploits for each vulnerability. Vulnerability threat management platform 115 may determine the number of exploits for each vulnerability based on the vulnerability identifier. Vulnerability threat management platform 115 may also rank or order the list of vulnerabilities based on the CVSS score of a vulnerability in addition to the number of breaches of a particular vulnerability.

Furthermore, since vulnerability threat management platform 115 may either fetch breach data at a particular time interval or receive breach data at a particular time interval, vulnerability threat management platform 115 may periodically analyze vulnerabilities of each customer against the freshly fetched or received breach data. In an embodiment, a customer's vulnerabilities may be analyzed in a similar frequency as the frequency at which breach data is fetched or received, thereby providing, in near real-time, reassessment of the customer's vulnerabilities.

Figure 3:
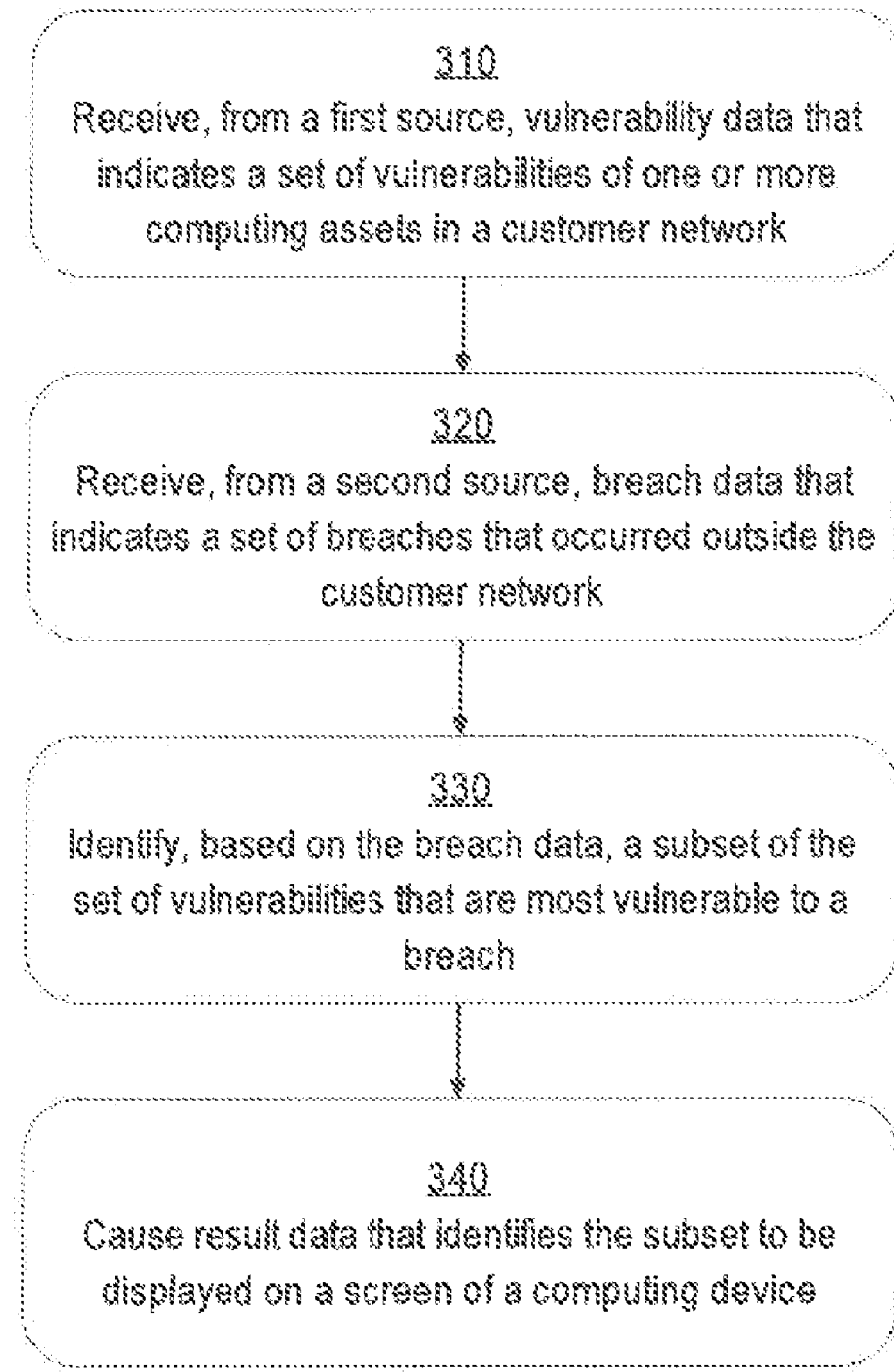
FIG. 3 illustrates a method of identifying vulnerabilities based on breach data.

FIG. 3 illustrates an example method for identifying a subset of vulnerabilities from a set of vulnerabilities that are most vulnerable to a breach based on breach data. In an embodiment, the operations described for FIG. 3 may be performed by vulnerability threat management platform 115 of FIG. 1 or FIG. 2, but other embodiments may implement the same functions in other contexts using other computing devices.

In step 310, vulnerability data that indicates a set of vulnerabilities of computing assets in a customer network is received from a first source. In an embodiment, the first source may be a customer. In an embodiment, the vulnerability data received from the first source may include, for each vulnerability, the vulnerability identifier, such as a CVE-ID or WASC ID.

In step 320, breach data that indicates a set of breaches that occurred outside of the customer network is received from a second source. Breach data may indicate a frequency with which each breach in the set of breaches occurred outside the customer network. For example, for vulnerability V1, the breach data may indicate 89 in the last 30 minutes while for vulnerability V2, the breach data may indicate 23 in the last 30 minutes. In some embodiments, the second source may be an external data source that provides a breach data feed at a periodic time interval. In some embodiments breach data may be received from more than one source, where the other sources are different from the first or second sources.

In step 330, a subset of the set vulnerabilities that are most vulnerable to a breach are identified based on the breach data received. In an embodiment, the identification of the subset of vulnerabilities that are most vulnerable to a breach is based on matching vulnerability identifiers of the set of vulnerabilities with vulnerability identifiers in the breach data. In an embodiment, the identified subset of vulnerabilities is ranked based on the number of times a vulnerability in the subset of vulnerabilities has been breached. In an embodiment, a subset of the set vulnerabilities that are most vulnerable to a breach are identified based on the breach data received and the number of exploits available for each vulnerability indicated in the exploit data received. In an embodiment, a subset of the set vulnerabilities that are most vulnerable to a breach are identified based on the breach data received and the CVSS score of a vulnerability included in the vulnerability data received.

In step 340, result data that identifies the subset of vulnerabilities is caused to be displayed on the screen of a computing device. In an embodiment, the subset of vulnerabilities that are displayed on the screen of a computing device is a ranked or ordered subset of vulnerabilities. In an embodiment, each computing asset of the computing assets in the customers network is one of a database, an operating system, an application, a desktop computer, a mobile computer, a server, or source code.

4.0 RISK SCORE

In an embodiment, the information related to risks posed by the vulnerabilities may be presented as a risk score. As described previously, a risk score may be a numerical value in a range of numerical values, such as between 0 and 1000, and indicates how vulnerable a particular asset may be of being successfully exploited or breached.

In an embodiment, vulnerability threat management platform 115 determines a risk score based upon several contextual factors, including, but not limited to, a number of active breaches of each of the vulnerabilities of the computing asset, the prevalence (or number) of available exploits for each vulnerability, popularity of the computing asset or how widely the computing asset is used in the customer's industry or across all industries, difficulty of exploiting the vulnerability, and importance of the computing asset to the customer.

In some embodiments, the risk score of a computing asset may reflect the risk posed by the most vulnerable vulnerability of the computing asset's vulnerabilities. In other words, the vulnerability that is most likely at risk of being successfully exploited or breached may represent the risk score of the computing asset instead of simply being, for example, an average of multiple risk scores associated with vulnerabilities of the computing asset.

The risk score of a computing asset may be provided to a customer upon receiving a request from the customer for a risk score of the computing asset. In some embodiments, the risk score of a computing asset may be forwarded to the customer once analysis of the computing asset's vulnerabilities is completed and the computing asset's risk score is determined.

In an embodiment, vulnerability threat management platform 115 provides a risk score for a computing asset or a group of computing assets. Vulnerability threat management platform 115 may determine multiple computing assets to be grouped based on customer input. For example, some of the computing assets of a financial services company are responsible for maintaining and storing sensitive personal information of customers of the financial services company. Determining the risk of these computing assets being breached may be very important to the financial services company or even required of the financial services company. Therefore, the financial services company may request a risk assessment of a group comprising of the particular assets responsible for maintaining and storing sensitive personal information. Vulnerability threat management platform 115 may then provide a risk score representing the group's risk of being breached.

There is no limit on the manner in which computing assets may be grouped together. For example, computing assets may be grouped together based on geographical location of computing assets, on the type of computing assets, on the subnet of computing assets, or on input from a customer (e.g., 104a).

In some embodiments, the risk score of a group of computing assets may be an average of the risk scores of the computing assets. In some embodiments, the risk score of a group of computing assets may be determined using a more complex method than an average of risk scores. Alternatively, a risk score of a group of computing assets may be the highest risk score of any individual computing asset in the group of computing assets.

Vulnerability threat management platform 115 may also store information enabling a future grouping of the particular assets indicated in storage unit 112 such that vulnerability threat management platform 115 may retrieve the information in order to group the particular assets and determine a risk score the next time the customer requests for a risk assessment of the group of computing assets.

In some embodiments, a range of colors may also be presented, in addition to the risk score, to indicate the criticality of the risk score to the customer. For example, if the risk score indicates that the particular computing asset is at a high risk of being breached, then the risk score may be encompassed within a ring of red color or the risk score itself may be presented in red color or it may be a combination of both, a ring of red color encompassing a risk score in red color. A particular color may represent a range of risk scores such that it may present a visual cue to the seriousness of the risk. For example, green may be used to present a low level of risk, yellow may be used to present a medium level of risk and red may be used to present a high level of risk. There may be more or less risk score ranges than the three described herein.

Figure 4:
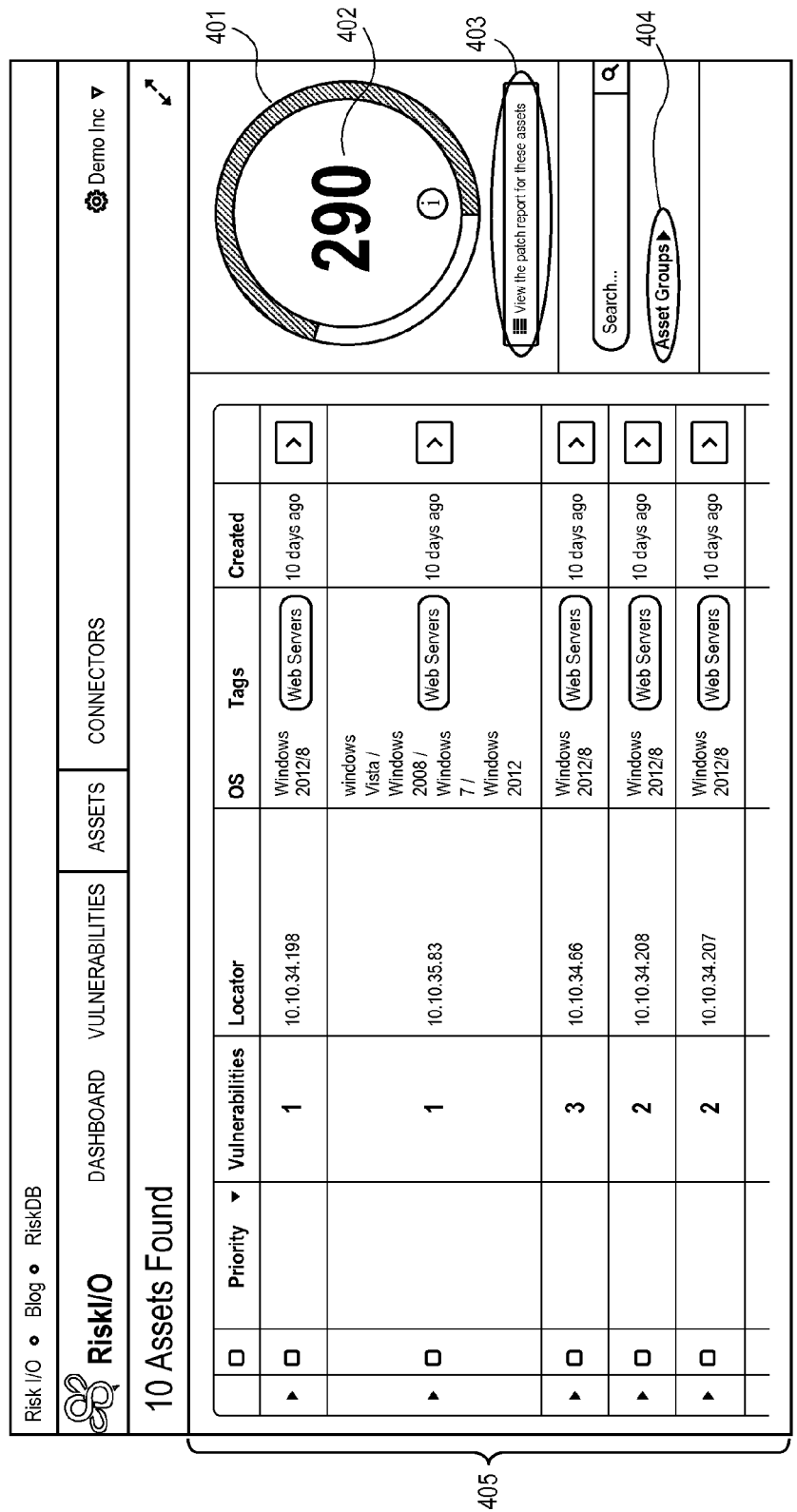
FIG. 4 illustrates an example arrangement of a graphical user interface for presenting risk information related to computing assets of a customer.

FIG. 4 illustrates an example arrangement of a graphical user interface for presenting risk information related to computing assets of a customer. In an embodiment, color ring 401 displays a color that corresponds to a criticality of a risk score 402. In some embodiments, color ring 401 may be filled with color in proportion to risk score 402. For example, in FIG. 4, risk score of the ten assets is 290 out of 1000, therefore only 29 percent of color ring 401 is filled with a particular color. As described above, colors may be predefined to represent certain risk score ranges. In FIG. 4, green has been predefined to represent a risk score of at least 290. In an embodiment, risk score 402 is also presented in the color reflecting its criticality. A combined graphical representation of color ring 401 and risk score 402 is referred to as a "risk meter."

In an embodiment, button 403 represents a list of ordered or ranked remediations that may be presented upon user clicking button 403. In some embodiments, the list of ordered or ranked remediations may be presented upon hovering over button 403.

Dropdown list 404 may be used to present asset groups described above. In an embodiment, dropdown list 404 may be used to view and switch between different asset groups in a fast and efficient manner to make it easy for customers to manager a large number of asset groups without wasting time searching for different assets.

In an embodiment, grid 405 may be used to present asset information. Within grid 405, each asset may be presented in a separate row along with certain attributes of the asset indicated in columns of grid 405, such as number of vulnerabilities of the asset, priority value of the asset, the location of asset over the internet, operating system(s) of the asset, one or more tags associated with the asset, and a creation date of the asset or vulnerability. In some embodiments, grid 405 may be interactive such that a user may apply changes to grid 405 and risk score 402 reflects the changes. For example, a user may change priority value of a particular asset, causing risk score 402 to be adjusted according to the newly given importance to the particular asset.

Figure 5:
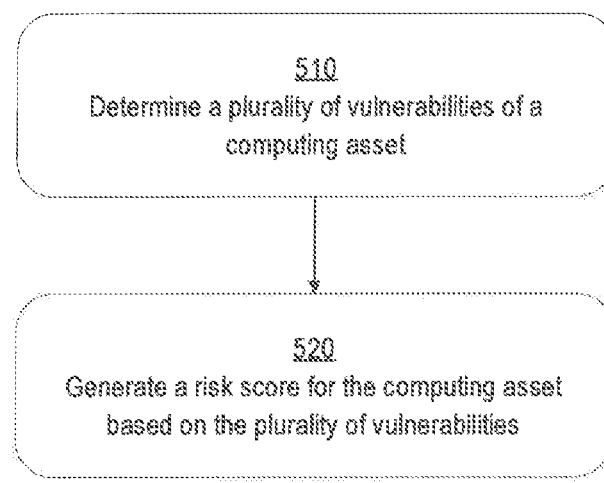
FIG. 5 illustrates a method of generating a risk score based on one or more vulnerabilities of a computing asset.

FIG. 5 depicts an example process for determining a risk score for one or more computing assets. In an embodiment, the steps indicated in FIG. 5 may be performed by vulnerability threat management platform 115 of FIG. 1, FIG. 2, but other embodiments may implement the same functions in other contexts using other computing devices.

At block 510, a plurality of vulnerabilities of a computing asset are determined. Vulnerabilities of the computing asset may be based on vulnerability data provided by a customer.

In step 520, a risk score for the computing asset is generated based on the plurality of vulnerabilities. In an embodiment, the risk score for the computing asset may also be based on certain contextual factors such as importance of the asset to the customer.

While FIG. 5 depicts a process where a risk score is generated for a single computing asset, as noted previously, a risk score may be generated for a set of two or more computing assets. A risk score for more than one computing asset may be based on vulnerabilities of each computing asset in the set of computing assets. For example, assets A1 and A2 each have a single vulnerability: V1 for A1 and V2 for A2. A risk score is generated for the set that includes A1 and A2 based on V1 and V2. Thus, a risk score may be generated for a set of two or more computing assets based on a single vulnerability for each computing asset in the set.

In an embodiment, a risk score of a set of computing assets may be displayed on a screen of computing device. An input that selects the risk score may be received and in response to receiving the input that selects the risk score, data that indicates each computing asset in the set of computing assets is displayed on screen. In an embodiment, the data that indicates each computing asset may include a risk score for the computing asset, vulnerabilities of the computing asset, and/or list of remediations to resolve the vulnerabilities of the computing asset. In an embodiment, a set of computing assets may be grouped based on geographical location of the computing assets in the set, the type of computing assets, the subnet of the computing assets, or customer input.

In some embodiments, the risk scores of different computing assets or groups of computing assets may be displayed concurrently, referred to herein as a dashboard, to the customer. In some embodiments, vulnerability threat management platform 115 presents risk scores of computing assets to a customer in a manner that enables the customer to drill down into a group of computing assets and determine the risk score for each computing asset of the group of computing assets. Therefore, the customer is able to view a risk score for the particular computing asset without having to request a risk assessment for the particular computing asset, nor would the customer have to search the rest of the dashboard for the particular computing asset.

Figure 6A:
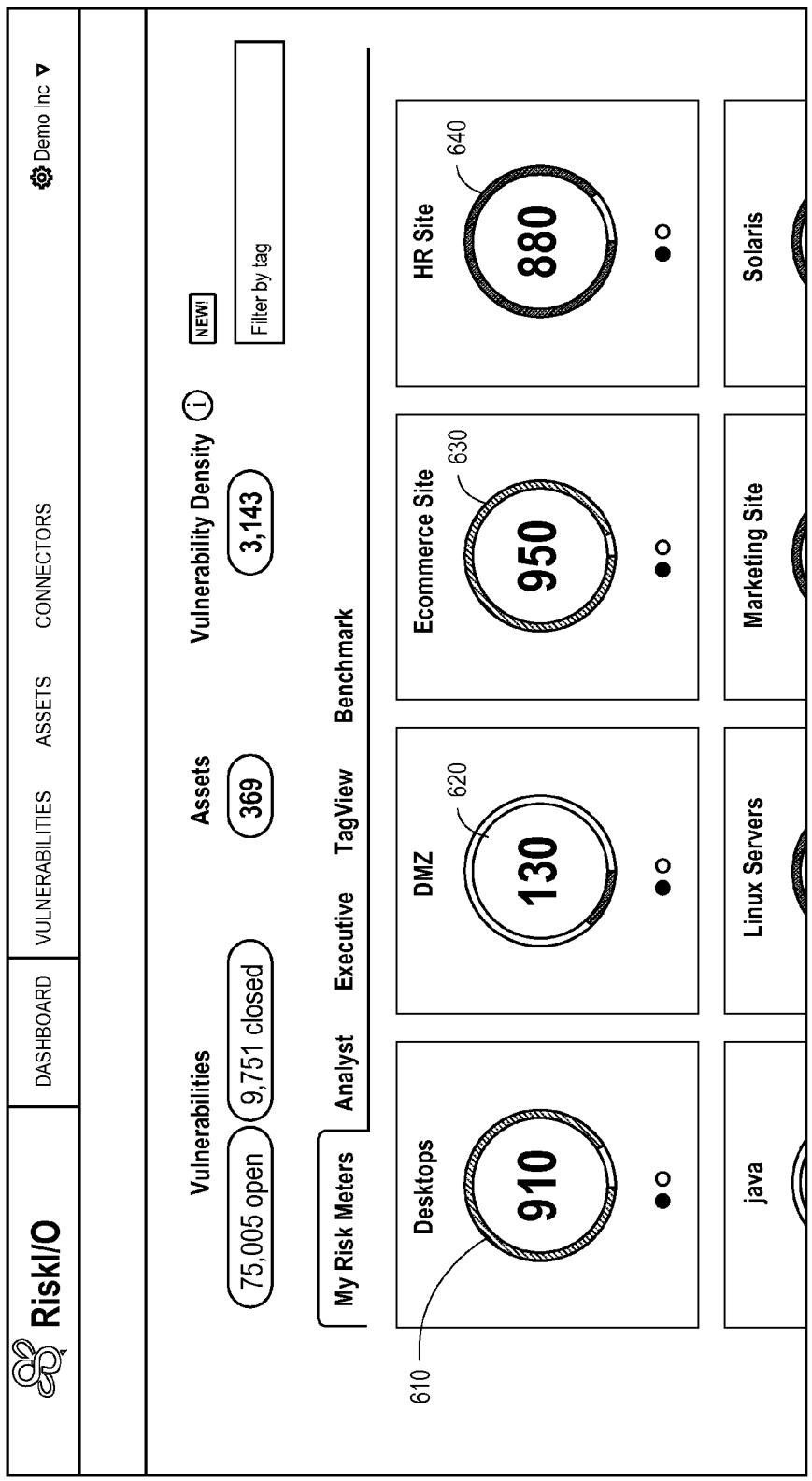
FIG. 6A-6B are block diagrams that depict an example arrangement of a graphical user interface of a dashboard.
Figure 6B:
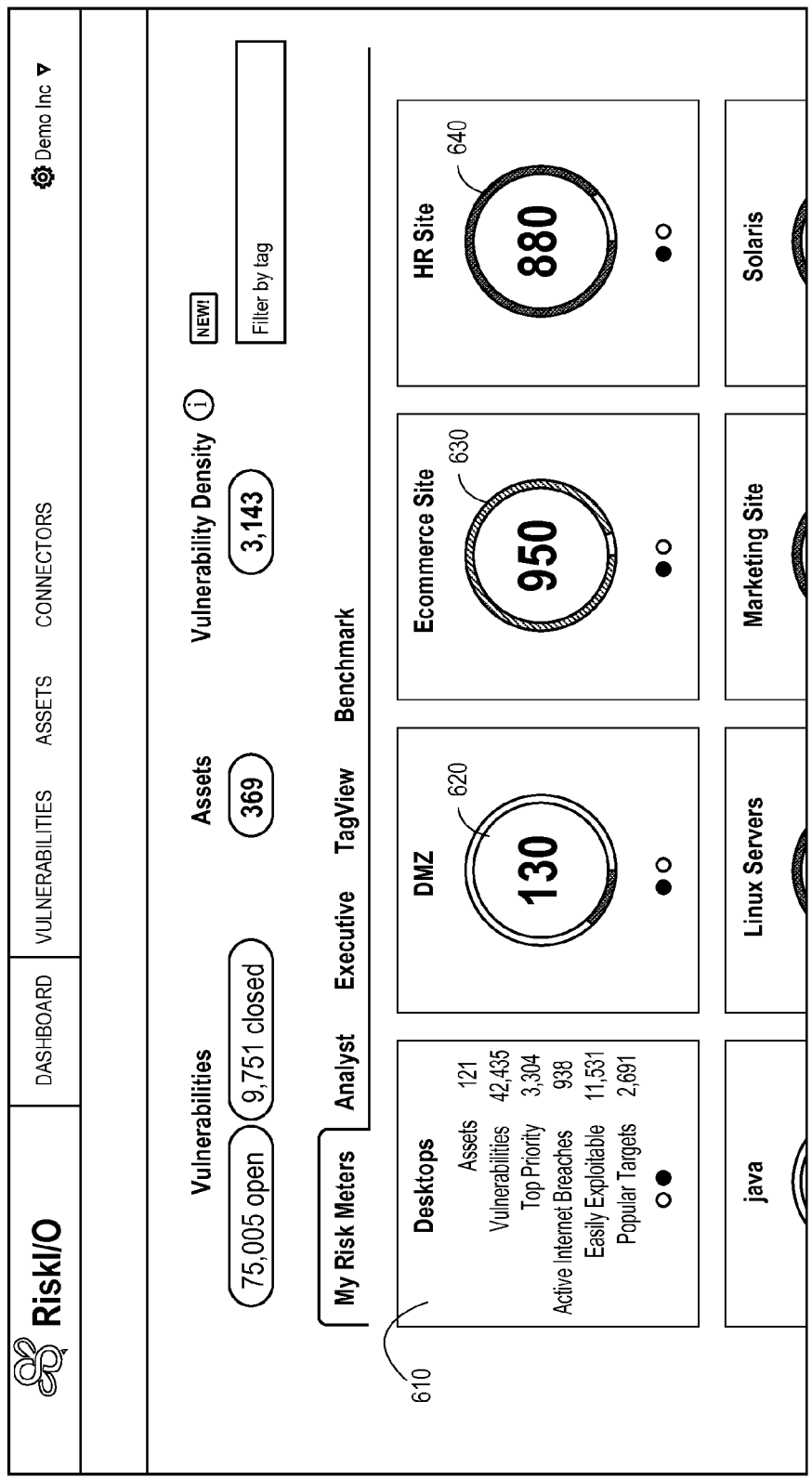

FIG. 6A-6B are block diagrams that depict an example arrangement of a graphical user interface of a dashboard. In FIG. 6A, a dashboard displays various risk meters 610-640, where each risk meter includes risk information related to a particular computing asset group of a customer. For example, risk meter 610 corresponds to desktops in a customer's network while risk meter 630 corresponds to assets involved in the customer's ecommerce website.

In an embodiment, the dashboard may be presented in a grid form as depicted in FIGS. 6A-6B. Risk meters may be presented in such a manner such that clicking or hovering over a risk meter may display computing assets represented by the risk meter. For example, user selection of risk meter 610 may cause the dashboard depicted in FIG. 6B to be displayed, including group data 612. Group data 612 indicates a number of assets in the "Desktops" group, a number of vulnerabilities in that group, a number of vulnerabilities in the group that are considered "Top Priority" (according to some specified criteria), a number of active Internet breaches associated with vulnerabilities in the group, an number of "easily" exploitable vulnerabilities in the group, and a number of popular targets (indicating which vulnerabilities have been the target of the most breaches) in the group.

The dashboards represented in FIGS. 6A-6B also include total aggregate information, such as the total number of vulnerabilities in a customer network (74,005), the total number of "closed vulnerabilities" (9,751) (which are fixed or remediated vulnerabilities, the total number of assets in the customer network, and a vulnerability density (3,143), which may represent the average number of vulnerabilities per asset group or the median number of vulnerabilities across the asset groups.

The dashboards represented in FIGS. 6A-6B may also be fully customizable, such as customizing which asset groups are displayed first or at the top of a view, what information is displayed when a risk meter is selected, and alert information indicating whether an audio alert, visual alert, or message alert (e.g., text, IM) should be sent when a risk score for a risk meter exceeds a certain threshold and/or when multiple risk scores exceed a particular threshold.

5.0 REMEDIATION LIST

In an embodiment, vulnerability threat management platform 115 provides an ordered or ranked list of remediations applicable to the computing asset. In an embodiment, vulnerability threat management platform 115 analyzes vulnerability data 109, 110, 111, sent by customers 104a, 104b, 104c, respectively, and selects remediations based on mappings of vulnerabilities and remediations. In some embodiments, a remediation may be mapped to one or more vulnerabilities. The list of remediations will be ordered or ranked according to the impact on the overall risk score of a computing asset or a group of computing assets.

In an embodiment, the ranking or ordering of list remediations may also be based on ease of implementation or application (e.g., in terms of time and/or work required by the customer) of a remediation, where remediations that are easier to implement or apply are preferred over remediations that are more difficult to implement or apply. For example, remediation R1 takes about ten minutes to apply and remediation R2 takes about nine hours to apply. R1 may be ranked higher than R2 even if R1 has a slightly higher impact on the risk score than the impact of R2 has on the risk score.

In an embodiment, mappings of vulnerabilities and remediations may be stored in storage unit 112. In an embodiment, vulnerability threat management platform 115 presents the list of remediations concurrently with ranked or ordered list of vulnerabilities of a computing asset or group of computing assets, or risk score of a computing asset or a group of computing assets, or both.

Figure 7:
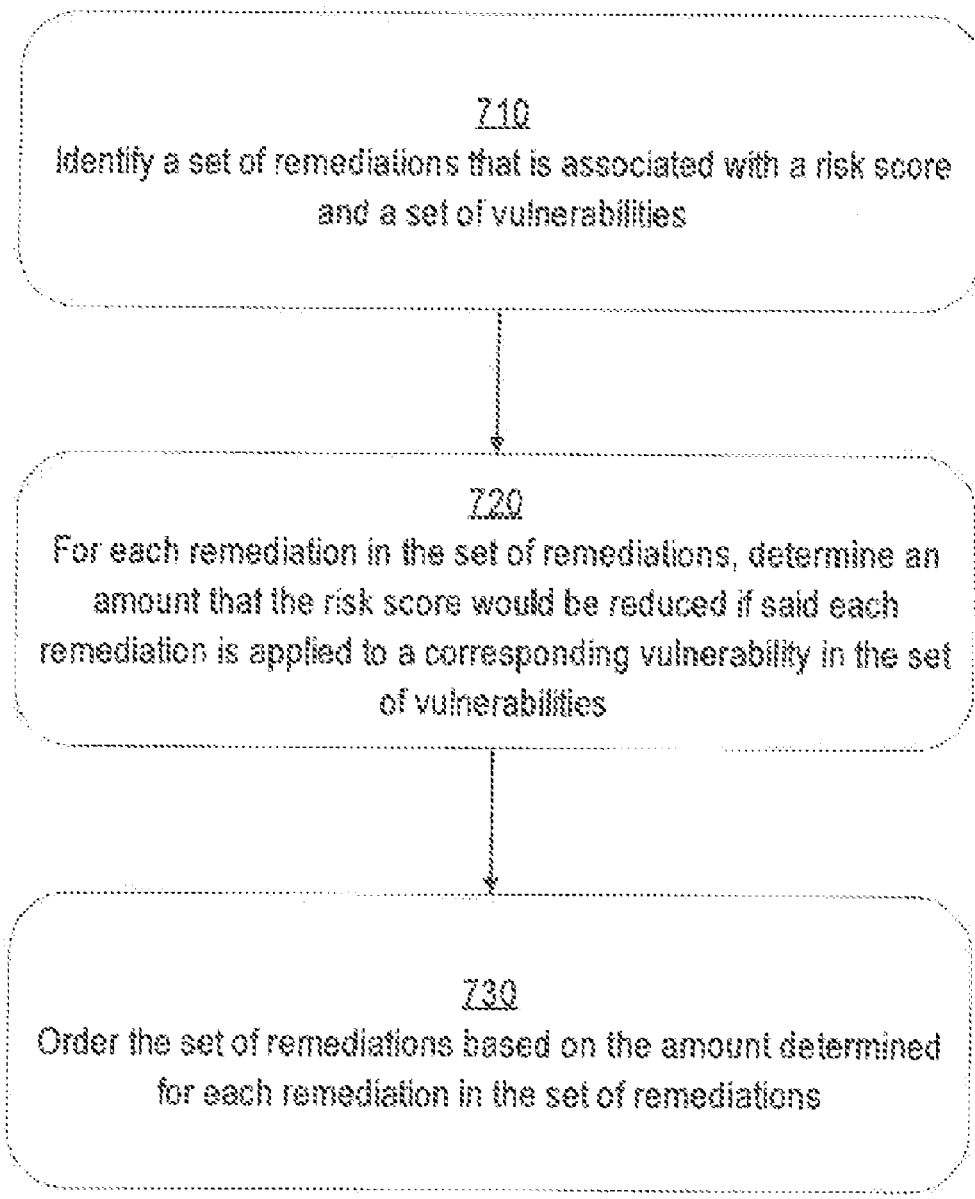
FIG. 7 illustrates a method of prioritizing a set of remediations.

FIG. 7 illustrates an example method for determining a set of remediations for one or more vulnerabilities of a computing asset. In an embodiment, the example method may be performed by vulnerability threat management platform 115 of FIG. 1 or FIG. 2, but other embodiments may implement the same functions in other contexts using other computing devices.

At block 710, a set of remediations associated with a set of vulnerabilities is identified. In an embodiment, the remediations may be identified based on the identifiers of each vulnerability in the set of vulnerabilities. The set of remediations may come from one of customers 104a-104c, one of sources 101-103, and/or another source, not depicted.

At block 720, for each remediation in the set of remediations, an amount that the risk score would be reduced if said each remediation is applied to a corresponding vulnerability in the set of vulnerabilities is determined.

At block 730, the set of remediations is ordered based on the amount the risk score is reduced by each remediation in the set of remediations. In an embodiment, the set of remediations may also be ordered by ease of implementation of each remediation.

In an embodiment, a customer is allowed to select a remediation to be applied to its corresponding vulnerability. Once applied and the vulnerability is removed, the set of remediations is updated to remove the selected remediation. Afterwards, an updated risk score may be generated based on the updated set of remediations. Also, blocks 520 and 530 may be performed again for the updated set of remediations and based on the updated risk score.

The embodiments described herein may enable for an assessment of risk associated with a computing asset and provide an effective and efficient manner in reducing the risk posed by one or more vulnerabilities of a computing asset or a group of computing assets.

6.0 IMPLEMENTATION MECHANISMS—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
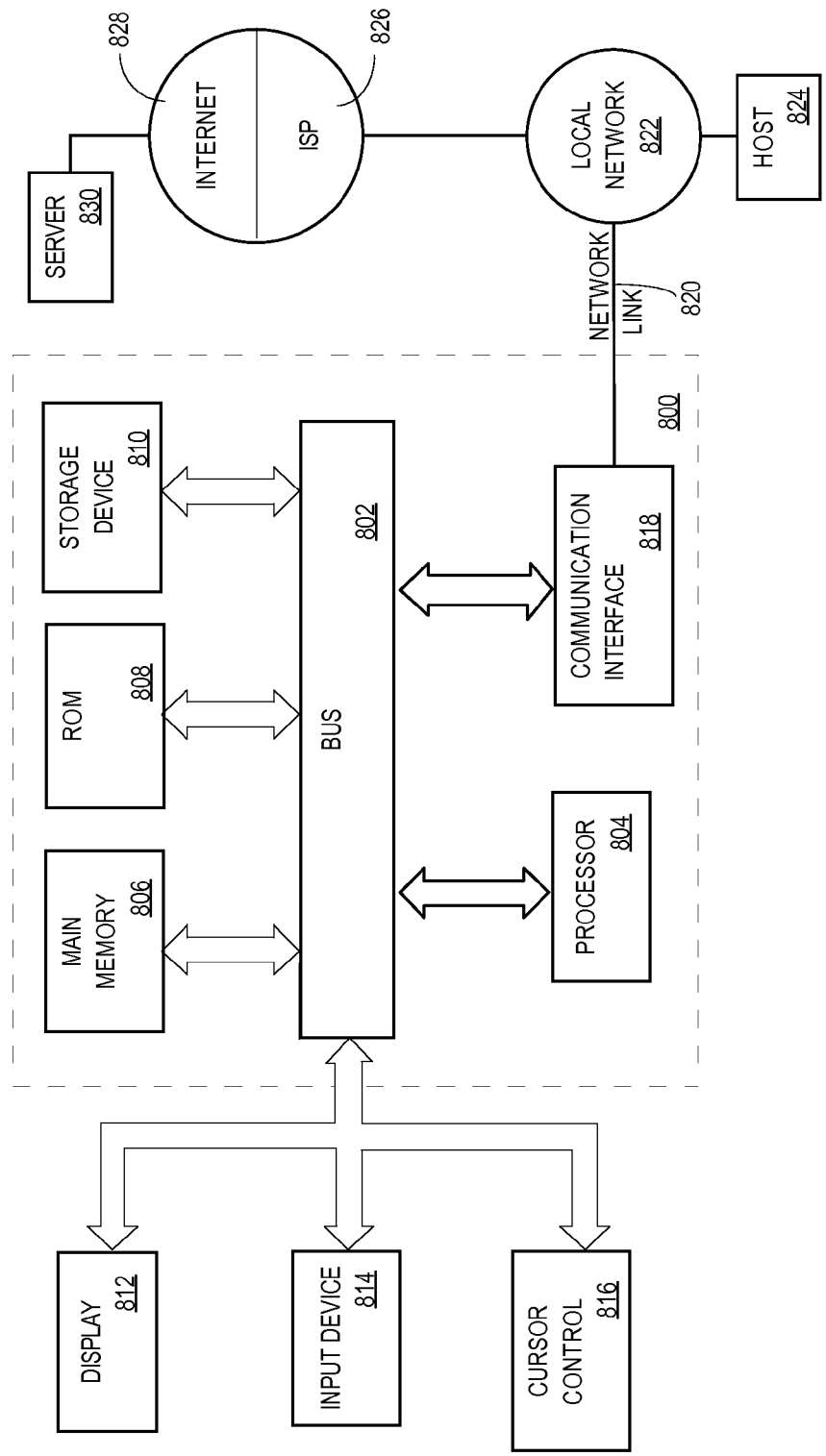
FIG. 8 illustrates a computer system upon which an embodiment may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

7.0 EXTENSIONS AND ALTERNATIVES

In the foregoing specification, embodiments of the disclosure have been described with reference to numerous specific details that may vary from implementation to implementation. Thus, the sole and exclusive indicator of what is the disclosure, and is intended by the applicants to be the disclosure, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    determining a first plurality of vulnerabilities of a first computing asset;
    generating a first risk score for the first computing asset based on the first plurality of vulnerabilities and on one or more contextual factors that include a number of available exploits for each vulnerability of the first plurality of vulnerabilities,
    wherein the number of available exploits for a first vulnerability is a first number of available exploits and the number of available exploits for a second vulnerability is a second number of available exploits,
    wherein the first number of available exploits is different than the second number of available exploits;
    wherein the method is performed by one or more computing devices.

2. The method of claim 1, further comprising:
    determining a second plurality of vulnerabilities of a second computing asset that is different than the first computing asset;
    generating, based on the first plurality of vulnerabilities and the second plurality of vulnerabilities, a second risk score for a set of computing assets that includes the first computing asset and the second computing asset.

3. The method of claim 2, further comprising:
    causing the second risk score to be displayed on a screen of a computing device;

receiving input that selects the second risk score;
in response to receiving the input that selects the second risk score, causing data that indicates each computing asset in the set of computing assets to be displayed on the screen of the computing device.

4. The method of claim 1, wherein the first computing asset is one of a database, an operating system, an application, a desktop computer, a server, or source code.

5. The method of claim 1, further comprising:
causing, to be displayed concurrently on a screen of a computing device, a plurality of risk scores, each of which is associated with a different computing asset or a different set of computing assets;
wherein each computing asset or set of computing assets is associated with a different plurality of vulnerabilities.

6. The method of claim 1, wherein the one or more contextual factors include a number of active breaches of each vulnerability of the first plurality of vulnerabilities, wherein the active breaches occurred to computing assets that are external to a network that includes the first computing asset.

7. The method of claim 1, wherein the one or more contextual factors include one or more values that indicate a popularity of the first computing asset across one or more organizations that are different than an organization that owns the first computing asset.

8. The method of claim 1, wherein the one or more contextual factors include one or more values that indicate the difficulty of exploiting a particular vulnerability of the first plurality of vulnerabilities.

9. The method of claim 1, further comprising:
receiving one or more values that indicate an importance of the first computing asset to a customer;
wherein the one or more contextual factors includes the one or more values that indicate the importance of the first computing asset to the customer.

10. An apparatus comprising:
one or more processors;
one or more non-transitory computer-readable media storing instructions which, when executed by the one or more processors, cause:
determining a first plurality of vulnerabilities of a first computing asset;
generating a first risk score for the first computing asset based on the first plurality of vulnerabilities and on one or more contextual factors that include a number of available exploits for each vulnerability of the first plurality of vulnerabilities,
wherein the number of available exploits for a first vulnerability is a first number of available exploits and the number of available exploits for a second vulnerability is a second number of available exploits,
wherein the first number of available exploits is different than the second number of available exploits.

11. A method comprising:
determining a first plurality of vulnerabilities of a first computing asset;
generating a first risk score for the first computing asset based on the first plurality of vulnerabilities;
determining a second plurality of vulnerabilities of a second computing asset that is different than the first computing asset;
determining to include the first computing asset and the second computing asset in a set of computing assets based on geographical location of the first and second computing assets, type of the first and second computing assets, or subnet of the first and second computing assets;
generating, based on the first plurality of vulnerabilities and the second plurality of vulnerabilities, a second risk score for the set of computing assets that includes the first computing asset and the second computing asset;
wherein the method is performed by one or more computing devices.

12. The method of claim 11, wherein determining to include the first computing asset and the second computing asset in the set of computing assets comprises determining to include the first computing asset and the second computing asset in the set of computing assets based on geographical location of the first and second computing assets.

13. The method of claim 11, wherein determining to include the first computing asset and the second computing asset in the set of computing assets comprises determining to include the first computing asset and the second computing asset in the set of computing assets based on type of the first and second computing assets.

14. The method of claim 11, wherein determining to include the first computing asset and the second computing asset in the set of computing assets comprises determining to include the first computing asset and the second computing asset in the set of computing assets based on subnet of the first and second computing assets.

15. The apparatus of claim 10, wherein the instructions, when executed by the one or more processors, further cause:
determining a second plurality of vulnerabilities of a second computing asset that is different than the first computing asset;
wherein the second plurality of vulnerabilities includes more vulnerabilities than the first plurality of vulnerabilities;
generating a second risk score for the second computing asset based on the second plurality of vulnerabilities and on a number of available exploits associated with the second plurality of vulnerabilities;
wherein a number available exploits associated with the first plurality of vulnerabilities is greater than the number of available exploits associated with the second plurality of vulnerabilities;
wherein the first risk score is greater than the second risk score.

16. The apparatus of claim 10, wherein the instructions, when executed by the one or more processors, further cause:
determining a second plurality of vulnerabilities of a second computing asset that is different than the first computing asset;
generating, based on the first plurality of vulnerabilities and the second plurality of vulnerabilities, a second risk score for a set of computing assets that includes the first computing asset and the second computing asset.

17. The apparatus of claim 16, wherein the instructions, when executed by the one or more processors, further cause:
causing the second risk score to be displayed on a screen of a computing device;
receiving input that selects the second risk score;
in response to receiving the input that selects the second risk score, causing data that indicates each computing asset in the set of computing assets to be displayed on the screen of the computing device.

18. The apparatus of claim 10, wherein the first computing asset is one of a database, an operating system, an application, a desktop computer, a server, or source code.

19. The apparatus of claim 10, wherein the instructions, when executed by the one or more processors, further cause:
causing, to be displayed concurrently on a screen of a computing device, a plurality of risk scores, each of which is associated with a different computing asset or a different set of computing assets;
wherein each computing asset or set of computing assets is associated with a different plurality of vulnerabilities.

20. The apparatus of claim 10, wherein the one or more contextual factors include a number of active breaches of each vulnerability of the first plurality of vulnerabilities, wherein the active breaches occurred to computing assets that are external to a network that includes the first computing asset.

21. The apparatus of claim 10, wherein the one or more contextual factors include one or more values that indicate a popularity of the first computing asset across one or more organizations that are different than an organization that owns the first computing asset.

22. The apparatus of claim 10, wherein the one or more contextual factors include one or more values that indicate the difficulty of exploiting a particular vulnerability of the first plurality of vulnerabilities.

23. The apparatus of claim 10, wherein the instructions, when executed by the one or more processors, further cause:
receiving one or more values that indicate an importance of the first computing asset to a customer;
wherein the one or more contextual factors includes the one or more values that indicate the importance of the first computing asset to the customer.

24. The method of claim 1, further comprising:
determining a second plurality of vulnerabilities of a second computing asset that is different than the first computing asset;
wherein the second plurality of vulnerabilities includes more vulnerabilities than the first plurality of vulnerabilities;
generating a second risk score for the second computing asset based on the second plurality of vulnerabilities and on a number of available exploits associated with the second plurality of vulnerabilities;
wherein a number available exploits associated with the first plurality of vulnerabilities is greater than the number of available exploits associated with the second plurality of vulnerabilities;
wherein the first risk score is greater than the second risk score.

* * * * *